United States Patent [19]

Meisel et al.

[11] Patent Number: 4,600,776
[45] Date of Patent: Jul. 15, 1986

[54] CATIONIC ENAMINE DYESTUFF INDOLYLMETHINE DERIVATIVES

[75] Inventors: Karlheinrich Meisel; Roderich Raue, both of Leverkusen, Fed. Rep. of Germany

[73] Assignee: Bayer Aktiengesellschaft, Leverkusen, Fed. Rep. of Germany

[21] Appl. No.: 618,870

[22] Filed: Jun. 11, 1984

[30] Foreign Application Priority Data

Jun. 21, 1983 [DE] Fed. Rep. of Germany ....... 3322318

[51] Int. Cl.⁴ ................. C07D 209/12; C07D 403/12; A61K 7/13; D06P 3/60
[52] U.S. Cl. ..................................... 544/198; 544/128; 544/143; 544/144; 544/194; 544/207; 544/209; 544/363; 544/373; 546/18; 546/171; 546/176; 546/177; 546/178; 548/411; 548/455; 8/409; 8/536
[58] Field of Search ............... 544/128, 143, 144, 194, 544/198, 205, 207, 363, 373, 209; 546/18, 171, 176, 178, 177, 201; 548/411, 455

[56] References Cited

U.S. PATENT DOCUMENTS

| 2,077,063 | 4/1937 | Wolff | 548/455 |
| 3,850,913 | 11/1974 | Psaar | 548/455 |
| 4,496,719 | 1/1985 | Raue | 548/455 |

FOREIGN PATENT DOCUMENTS 0044061  7/1981  European Pat. Off. ........... 548/455

Primary Examiner—Henry R. Jiles
Assistant Examiner—J. G. Mullins
Attorney, Agent, or Firm—Sprung Horn Kramer & Woods

[57] ABSTRACT

Cationic enamine dyestuffs of the general formula

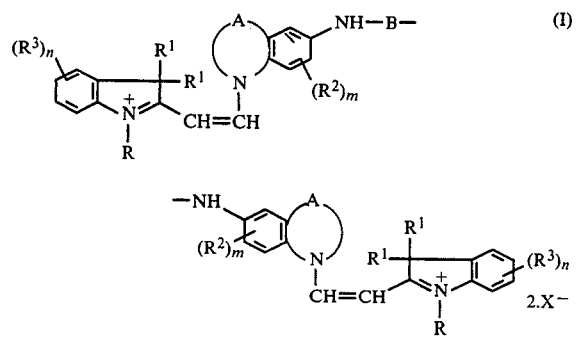

in which the symbols have the meaning given in the description, are used for dyeing natural and synthetic substrates and compositions which can be dyed with cationic dyestuffs, in particular paper.

5 Claims, No Drawings

CATIONIC ENAMINE DYESTUFF INDOLYLMETHINE DERIVATIVES

The invention relates to cationic enamine dyestuffs of the general formula

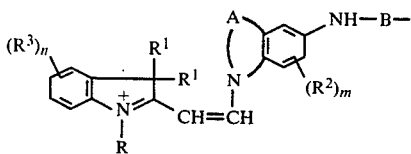  (I)

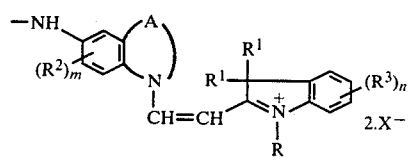  2.X⁻ in which

R and $R^1$ independently of one another represent alkyl, and the two radicals $R^1$ can also be closed to form a ring, $R^2$ represents alkyl, alkoxy or halogen, $R^3$ represents alkyl, halogen, alkoxy, aryl, aryloxy, aralkoxy, aralkyl, carboxyl, a carboxylic acid alkyl ester, a carboxamide or sulphonamide group which is optionally substituted by 1 or 2 alkyl radicals, alkylsulphonyl, arylsulphonyl or a cyano, nitro or acyl group, A represents a —(CH$_2$)$_2$— or —(CH$_2$)$_3$— group which is optionally further substituted by alkyl, B corresponds to a radical of the formula

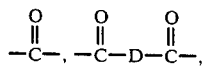

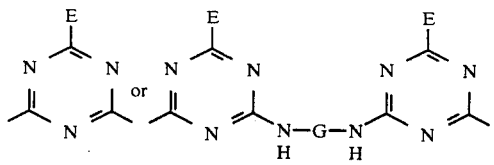

in which

D represents alkylene or arylene,

E represents halogen, hydroxyl, alkoxy or a radical of the formula

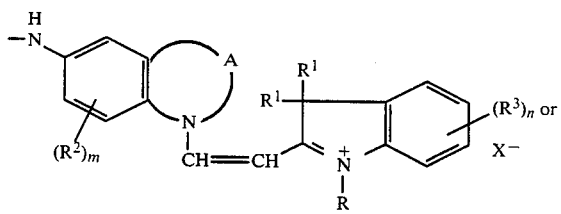

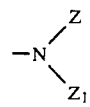

wherein

Z and $Z^1$ independently of one another designate hydrogen or the radical —Y—$Z^2$, wherein Y represents alkylene and $Z^2$ represents hydrogen, hydroxyl, pyridinium or the radical

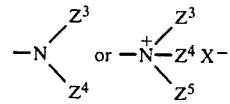

wherein $Z^3$, $Z^4$ and $Z^5$ independently of one another denote hydrogen or alkyl, and $Z^3$ also represents alkyl, aralkyl or the radical

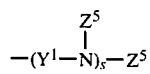

wherein $Y^1$ represents alkylene and s represents 1 to 8, or

Z and $Z^1$, and $Z^3$ and $Z^4$ are closed to form a ring and, together with the N atom, form a pyrrolidine, morpholine, piperidine or piperazine ring, which can be substituted by C$_1$–C$_4$-alkyl, G represents alkylene, arylene or a radical of the formula

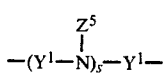

m and n independently of one another represent 0, 1 or 2 and

X⁻ represents an anion, and wherein the cyclic and acyclic radicals can be substituted by the non-ionic radicals customary in dyestuff chemistry, and to their preparation and their use for dyeing natural and synthetic substrates and compositions which can be dyed with cationic dyestuffs, in particular paper.

Halogen is preferably understood as being fluorine, chlorine or bromine.

Possible anions X$^{(-)}$ are the customary colourless organic and inorganic anions, for example chloride, bromide, iodide, hydroxyl, bisulphate, sulphate, nitrate, dihydrogen phosphate, hydrogen phosphate, phosphate, carbonate, methosulphate, ethosulphate, acetate, propionate, benzenesulphonate and toluenesulphonate.

The anion is in general determined by the preparation process. Halides, in particular chlorides, are preferred. The anions can be replaced by other anions in a known manner.

Enamine dyestuffs which are to be mentioned in particular are those of the general formula

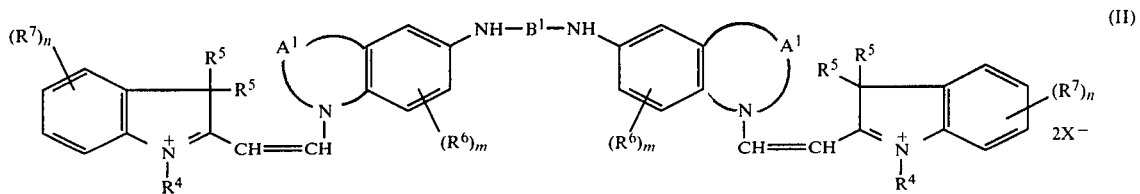

in which
- $R^4$ represents an alkyl radical which has 1 to 4 C atoms and is optionally substituted by hydroxyl, alkoxy with 1 to 4 C atoms, acetoxy, halogen, cyano, carboxyl, $C_1$-$C_4$-carbalkoxy, carboxamido or acetyl,
- $R^5$ represents an alkyl radical with 1 to 4 C atoms, it also being possible for the two radicals $R^5$ to be closed to form a ring, preferably a cyclopentyl or cyclohexyl ring,
- $R^6$ represents an alkyl radical with 1 to 4 C atoms, an alkoxy radical with 1 to 4 C atoms or halogen,
- $R^7$ represents an alkyl radical with 1 to 4 C atoms, halogen, alkoxy with 1 to 4 C atoms, phenoxy, benzyloxy, benzyl, carboxyl, a carboxylic acid alkyl ester with 1 to 4 C atoms, a carboxamide or sulphonamide group which is optionally substituted by 1 or 2 $C_1$ to $C_4$-alkyl radicals, alkylsulphonyl with 1 to 4 C atoms, phenylsulphonyl, or a cyano, nitro, trifluoromethyl, acetyl or benzoyl group,
- $A^1$ represents a $-(CH_2)_2-$ or $-(CH_2)_3-$ group which is optionally further substituted by alkyl groups with 1 to 4 C atoms,
- $B^1$ corresponds to a radical of the formula

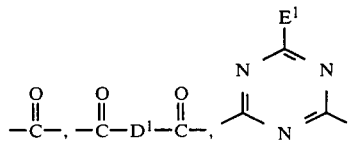

or

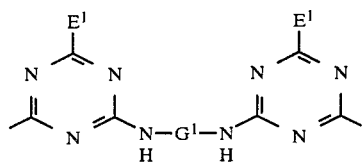

in which
- $D^1$ represents an alkylene radical with 2 to 6 C atoms or a phenylene or naphthylene radical,
- $E^1$ represents halogen, hydroxyl, alkoxy with 1 to 4 C atoms or a radical of the formula

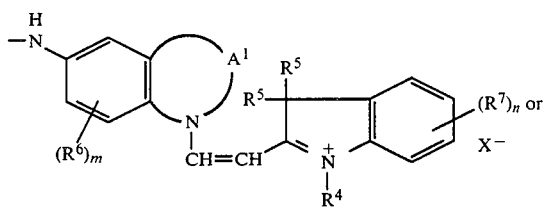

-continued

wherein
- $Z^6$ and $Z^7$ independently of one another designate hydrogen or the radical $-Y^1-Z^8$, wherein
- $Y^1$ represents alkylene with 1 to 6 C atoms and
- $Z^8$ designates hydrogen, hydroxyl, pyridinium or the radical

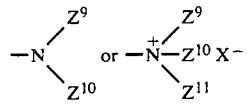

wherein
- $Z^9$, $Z^{10}$ and $Z^{11}$ independently of one another denote hydrogen or alkyl which has 1 to 4 C atoms and is optionally substituted by hydroxyl, and
- $Z^9$ also represents phenyl, benzyl or the radical

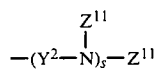

wherein
- $Y^2$ represents alkylene with 2 to 4 C atoms and s represents 1 to 8, or
- $Z^6$ and $Z^7$, and $Z^9$ and $Z^{10}$ are closed to form a ring and, together with the N atom, form a pyrrolidine, morpholine, piperidine or piperazine ring, which can be substituted by $C_1$- to $C_4$-alkyl or amino-$C_1$- to $C_4$-alkyl,
- $G^1$ represents an alkylene radical with 2 to 6 C atoms, a phenylene radical or a radical of the formula

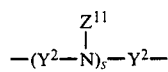

- m and n independently of one another represent 0, 1 or 2 and
- $X^-$ represents an anion.

Two preferred groups of the new dyestuffs correspond to the general formulae

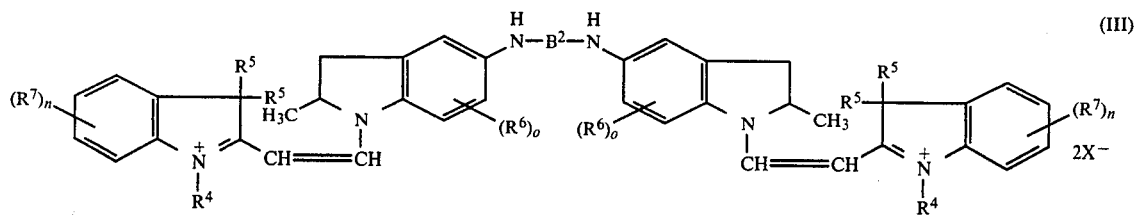

(III)

and

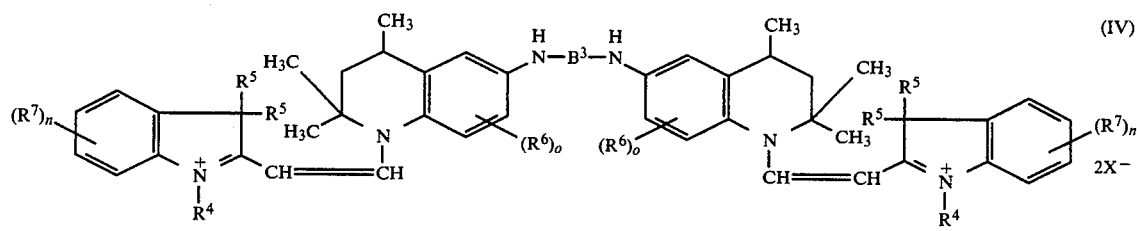

(IV)

wherein
o represents 0 or 1, preferably 0,
$B^2$ represents a radical of the formula

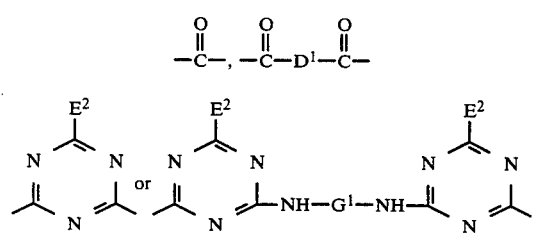

$E^2$ represents halogen, hydroxyl, alkoxy with 1 to 4 C atoms or a radical of the formula

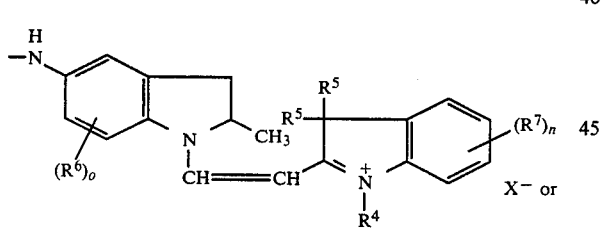

$B^3$ represents a radical of the formula

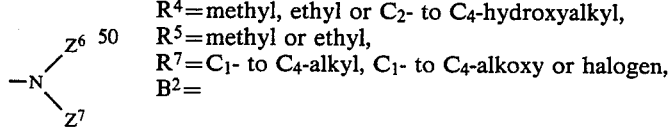

$E^3$ represents halogen, hydroxyl, alkoxy with 1 to 4 C atoms or a radical of the formula

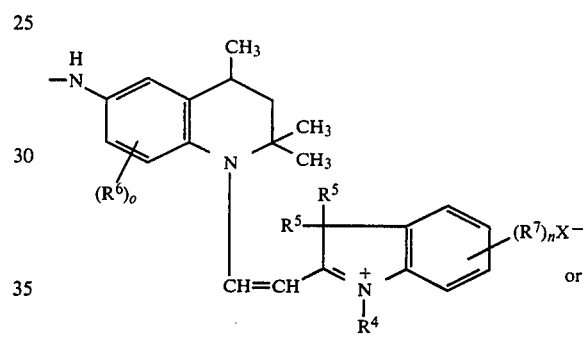

and
$R^4$, $R^5$, $R^6$, $R^7$, $D^1$, $G^1$, $Z^6$, $Z^7$, n and $X^-$ have the same meaning as in formula (II).

Dyestuffs of the formulae (III) and (IV) which are to be mentioned in particular are the dyestuffs
in which
$R^4$=methyl, ethyl or $C_2$- to $C_4$-hydroxyalkyl,
$R^5$=methyl or ethyl,
$R^7$=$C_1$- to $C_4$-alkyl, $C_1$- to $C_4$-alkoxy or halogen,
$B^2$=

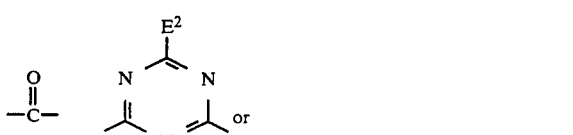

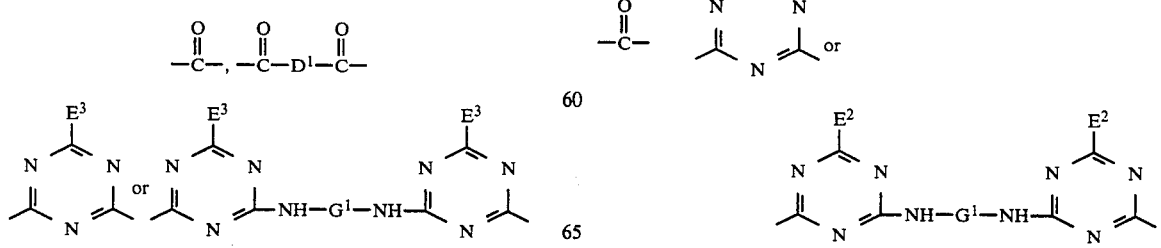

$E^2$=halogen, hydroxyl, alkoxy with 1 to 4 C atoms or

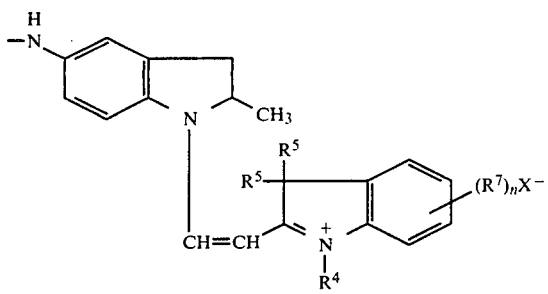

$o = 0$,
$n = 0$ or $1$,
$B^3 =$

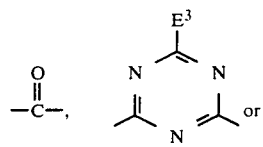

and $E^3$ = halogen, hydroxyl, alkoxy with 1 to 4 C atoms or

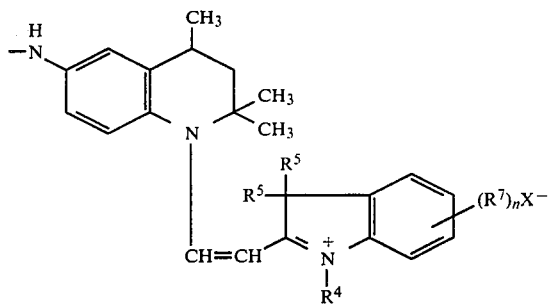

The new dyestuffs are obtained by a process in which compounds of the general formula

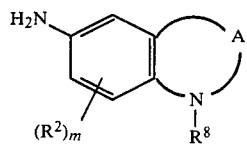

wherein $R^8$ represents an acyl radical, in particular a $C_1$–$C_3$-alkylcarbonyl radical, and $R^2$, A and m have the meaning given for formula (I), are reacted with dihalogeno compounds of the general formula Hal—B—Hal  (VI)

in which

B has the same meaning as in formula (1) and
Hal represents halogen, in aqueous or organic solution, with the addition of acid-binding agents, to give compounds of the formula

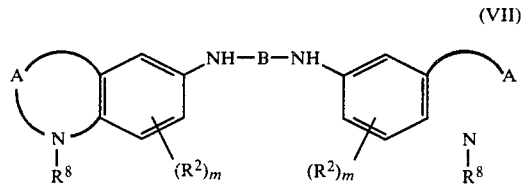

and the compounds of the formula (VII) are reacted, after the acyl radical $R^8$ has been split off, with compounds of the general formula

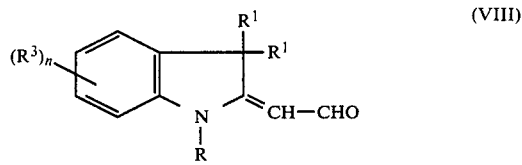

wherein

R, $R^1$, $R^3$, m and n have the meaning given for formula (I), in an acid medium.

In a preferred process, a procedure can also be followed in which compounds of the general formula (V) are first reacted with cyanuric chloride in a molar ratio of 1:1 to give compounds of the general formula

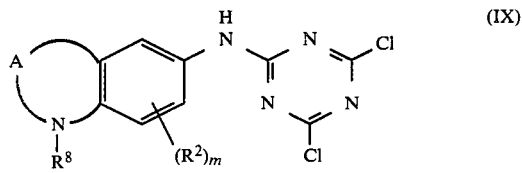

wherein

A, $R^2$, $R^8$ and m have the abovementioned meaning, and these are reacted with a diamine of the general formula $H_2N$—G—$NH_2$  (X)

wherein

G has the abovementioned meaning, in a molar ratio of 2:1 to give compounds of the formula

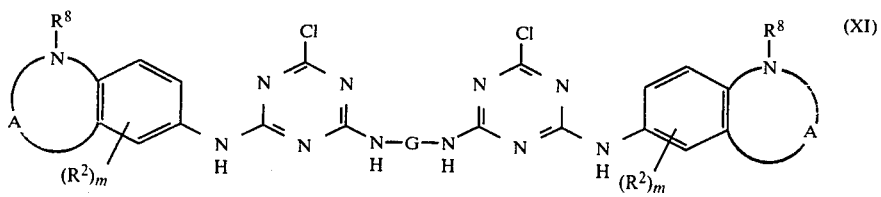

and these compounds, after the acyl radical $R^8$ has been split off, are subjected to a condensation reaction with compounds of the formula (VIII) to give the dyestuffs of the formula (I) according to the invention.

In a further preferred process, a procedure can be followed in which compounds of the formula (VII) in which $R^8$ designates the formyl radical, are reacted directly with compounds of the formula

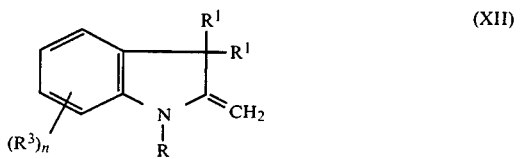

wherein

R, $R^1$, $R^3$ and n have the abovementioned meaning, to give compounds of the formula (I).

Examples of suitable compounds of the general formula (VI) are: phosgene, succinic acid dichloride, glutaric acid dichloride, adipic acid dichloride, terephthalic acid dichloride, isophthalic acid dichloride, cyanuric chloride, cyanuric bromide, cyanuric fluoride and compounds which are obtained by reacting 2 mol of cyanuric chloride with 1 mol of 1,4-phenylenediamine, 1,3-phenylenediamine, ethylenediamine, 1,4-diaminobutane, 1,6-diaminohexane, diethylenetriamine, triethylenetetraamine, dipropylenetriamine, tetraethylenepentamine, pentaethylenehexamine, bis-(aminoethyl)-methylamine, bis-(aminoethyl)-ethylamine or bis-(aminoethyl)-butylamine.

Examples of suitable acid-binding agents are: sodium bicarbonate, potassium bicarbonate, sodium carbonate, potassium carbonate, magnesium oxide, triethylamine and triisopropanolamine.

Possible solvents for the dimerisation are: water or organic solvents. Solvents which are water-miscible are preferred, such as acetone, dioxane, tetrahydrofuran, dimethylformamide, dimethylacetamide, tetramethylurea and other alkyl-substituted ureas. Water-immiscible solvents, such as, for example, chlorobenzene or dichlorobenzene, are also suitable.

The condensation of compounds of the formula (VII), after the acyl radical has been split off, with compounds of the formula (VIII) or of compounds of the formula (VII) in which $R^8$ represents the formyl group with compounds of the formula (XII) is carried out in a temperature range between 20° and 100° C., with the addition of dehydrating agents. Examples of suitable solvents or condensing agents are: phosphorus oxychloride, oxalic acid, phosphorus pentachloride and, preferably, glacial acetic acid.

The dyestuffs are suitable for dyeing anionically modified synthetic fibres, in particular for dyeing polyacrylonitrile materials. Outstanding light-fastness properties are obtained on these fibre materials. They are particularly suitable for dyeing during the spinning process, since the dyestuffs do not bleed in the stretching bath. The dyestuffs are furthermore suitable for dyeing acid-modified polyester fibres and natural fibre materials, such as cotton, viscose staple and leather. The dyestuffs are especially suitable for dyeing paper containing mechanical wood pulp and bleached sulphide cellulose, and they have a good affinity and a good fastness to wet processing and light on the latter.

EXAMPLE 1

20 g of N,N'-bis-(2,2,4-trimethyltetrahydroquinoline)-urea are dissolved in 200 ml of glacial acetic acid and the solution is heated at 40° C. with 19.75 g of 1,3,3-trimethyl-2-methyleneindoline-ω-aldehyde for 12 hours. If the starting material is used in moist form, it is advantageous to add a little acetic anhydride. The mixture is poured onto 1 liter of water and the dyestuff is precipitated by dropwise addition of concentrated NaCl solution. 41 g of the dyestuff of the formula

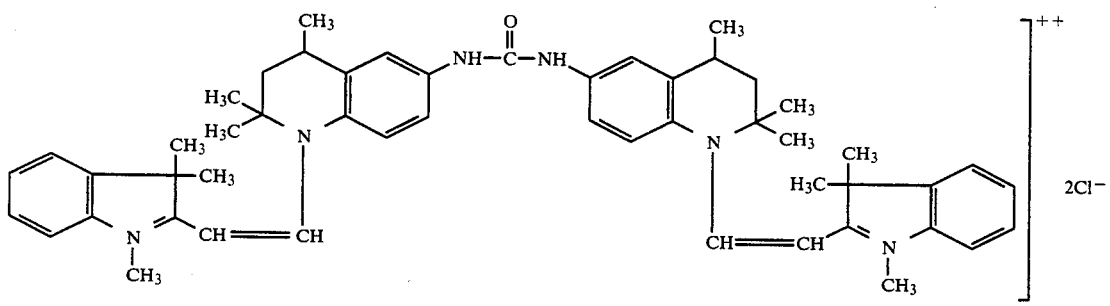

which dyes bleached sulphite pulp with good fastness properties, are obtained.

The N,N'-bis-(2,2,4-trimethyltetrahydroquinoline)-urea is prepared as follows:

86.8 g of N-acetyl-2,2,4-trimethyltetrahydroquinoline are dissolved in 600 ml of acetic anhydride and the solution is cooled to 0° C. 28 g of fuming nitric acid in 50 ml of acetic anhydride are now added dropwise. The mixture is kept at 0° C. for a further 30 minutes and is then stirred overnight at room temperature. It is poured onto water and the precipitate is filtered off with suction. 89 g of 1-acetyl-2,2,4-trimethyl-6-nitrotetrahydroquinoline of melting point 91° C. are obtained.

52.4 g of the 1-acetyl-2,2,4-trimethyl-6-nitrotetrahydroquinoline described above are dissolved in 400 ml of ethanol, the solution is heated to 40° C. with 17 g of hydrazine hydrate, and 20 g of Raney nickel in 350 ml of ethanol are added in portions. The mixture is kept at 40° C. for 4 hours, the catalyst is filtered off and the resulting solution is concentrated. The resulting product can be further reacted directly. For purification, it is dissolved in 500 ml of water, with the addition of 50 ml of concentrated hydrochloric acid, and the solution is extracted by shaking with 200 ml of chloroform. The aqueous phase is brought to pH 8 with concentrated sodium hydroxide solution and the precipitate which has separated out is filtered off with suction. Yield: 41 g of 1-acetyl-2,2,4-trimethyl-6-aminotetrahydroquinoline.

Melting point: 155° C.

40 g of the 1-acetyl-2,2,4-trimethyl-6-aminotetrahydroquinoline described above are warmed to 40° C. with 20 g of sodium carbonate and 200 ml of chlorobenzene, and phosgene is passed in until the reaction is complete. After blowing out with nitrogen, the residue is filtered off and washed with water. The residue is dissolved in ethyl acetate and the solution is extracted by shaking with dilute hydrochloric acid. When the ethyl acetate is concentrated, a precipitate separates out, and is filtered off with suction.

Yield: 30 g of the compound of the formula

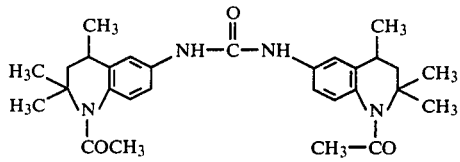

Melting point: 121° C.

30 g of the N,N'-bis-(1-acetyl-2,2,4-trimethyltetrahydroquinoline)-urea described above are heated under reflux in 200 ml of concentrated hydrochloric acid for 1 hour. The mixture is poured onto 800 ml of ice and rendered alkaline with sodium hydroxide solution and the precipitate is filtered off with suction.

Yield: 24.5 g of the compound of the formula

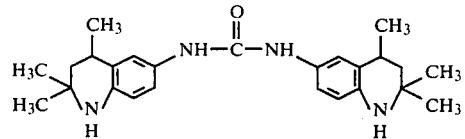

EXAMPLE 2

20 g of the intermediate 1-acetyl-2,2,4-trimethyl-6-aminotetrahydroquinoline described in Example 1 and 7.5 g of sodium bicarbonate are dissolved in 100 ml of tetramethylurea, and a solution of 7.9 g of cyanuric chloride in 50 ml of tetramethylurea is added dropwise at −5° to −10° C. The mixture is stirred at −10° C. for 2 hours and then at room temperature for 2 hours, and the temperature is increased to 40° C. for 1 hour. The solution is poured onto 400 ml of water and the precipitate is filtered off with suction. The moist precipitate is heated to the boiling point in 150 ml of concentrated hydrochloric acid for 1 hour, the solution is poured onto 400 g of ice, the mixture is rendered alkaline with NaOH and the precipitate is filtered off with suction. The moist precipitate can be further reacted directly, but the water content must be determined.

The precipitate is dissolved in 200 ml of glacial acetic acid, and 17.3 g of 1,3,3-trimethyl-2-methyleneindoline-ω-aldehyde are added. An amount of acetic anhydride corresponding to the water content is added and the mixture is kept at 40°-45° C. for 12 hours. The solution is poured onto 500 ml of water and the dyestuff is precipitated by dropwise addition of concentrated NaCl solution. 35 g of a yellow dyestuff of the formula

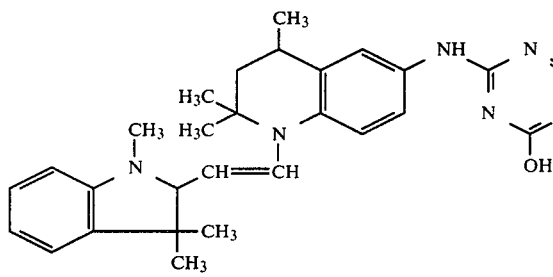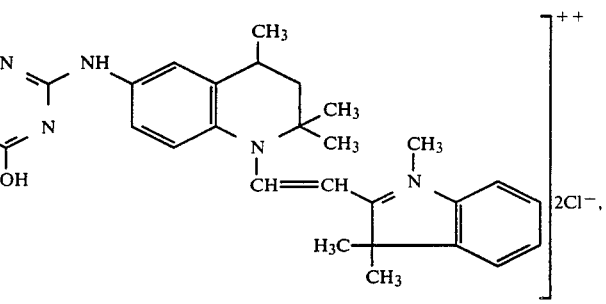

which dyes bleached sulphite pulp with good fastness properties and an almost colourless effluent, are obtained.

$\lambda_{max} = 444$ nm.

EXAMPLE 3

35 g of the compound of the formula

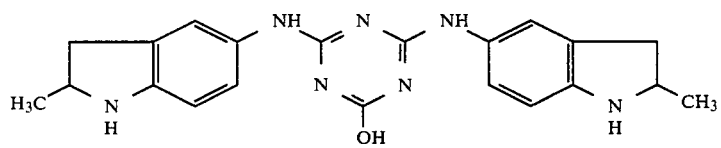

are dissolved in 250 ml of glacial acetic acid and the solution is heated to 40° C. with 36.2 g of 1,3,3-trimethyl-2-methyleneindoline-ω-aldehyde for 16 hours. If the starting substance is used in moist form, an appropriate addition of acetic anhydride is required. The mixture is poured onto 800 ml of water and the dyestuff is precipitated by dropwise addition of concentrated NaCl solution. 24 g of a yellow dyestuff of the formula

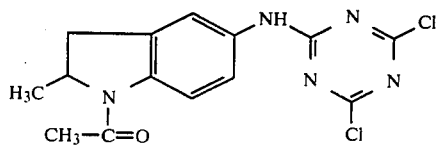

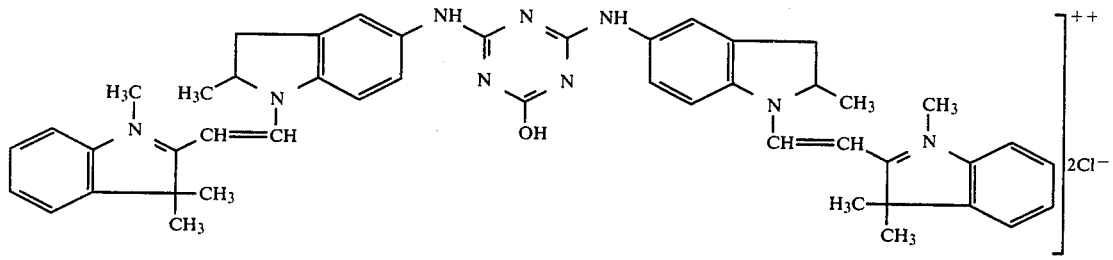

which dyes sulphite pulp with good fastness properties and an almost colourless effluent, are obtained.

$\lambda_{max} = 444$ nm.

The starting substance used here is prepared as follows:

40 g of 1-acetyl-2-methyl-5-nitroindoline are dissolved in 400 ml of ethanol and the solution is warmed to 35°–40° C. with 20 g of hydrazine hydrate. 20 g of Raney nickel in 250 ml of ethanol are added (slight foaming) and the mixture is stirred at 40° C. overnight. The catalyst is then filtered off and the solution is evaporated. The residue can be further reacted directly. For purification, it is dissolved in water, the pH is brought to 1 with concentrated hydrochloric acid and the solution is extracted by shaking with three portions of chloroform. The aqueous phase is brought to pH 8 with NaOH. An oil initially separates out, and crystallises after some time.

Yield: 34 g of 1-acetyl-2-methyl-5-aminoindoline

Melting point: 155°–156° C.

18.4 g of cyanuric chloride are dissolved in 250 ml of chloroform. After addition of 8.4 g of sodium bicarbonate, the suspension is cooled to −10° C., a solution of 19 g of the 1-acetyl-2-methyl-5-aminoindoline described above in 150 ml of chloroform is added and the mixture is stirred at room temperature for 12 hours and at 45° C. for 1 hour. The solvent is now distilled off and the residue is stirred with 200 ml of acetone for about 10 minutes, filtered off with suction and dried.

Yield: 27.2 g of the compound of the formula

Melting point: 262°–265° C. (decomposition).

A further 6.98 g of product, which is somewhat contaminated, are isolated from the mother liquor by evaporation on a rotary evaporator.

33.8 g of the intermediate described above are dissolved in 100 ml of tetramethylurea. 9 g of sodium bicarbonate are added and a solution of 19 g of 1-acetyl-2-methyl-5-aminoindoline in 50 ml of tetramethylurea is added dropwise at −5° C. The mixture is stirred at room temperature for 3 hours and heated at 40° C. for 2 hours. It is then poured onto 500 ml of H₂O and the precipitate is filtered off with suction. The moist precipitate is heated under reflux in 200 ml of concentrated hydrochloric acid for 1 hour and the mixture is poured onto 700 ml of water and rendered alkaline with NaOH.

Yield: 35 g of the compound used above.

EXAMPLE 4

4.66 g of the compound of the formula

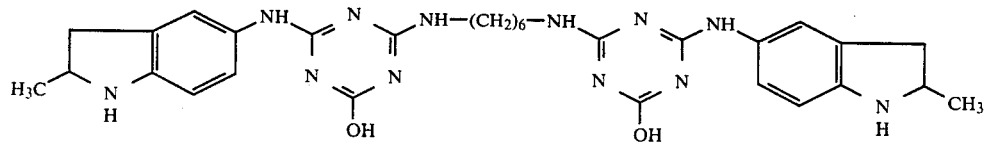

are stirred with 50 ml of acetic acid and 2.74 g of 1,3,3-trimethyl-2-methyleneindoline-ω-aldehyde at 40° C. for 24 hours. The mixture is poured onto 300 ml of water and clarified with active charcoal and the dyestuff is salted out with NaCl and dried at 50° C. in vacuo.

Yield: 4.9 g of the dyestuff of the formula

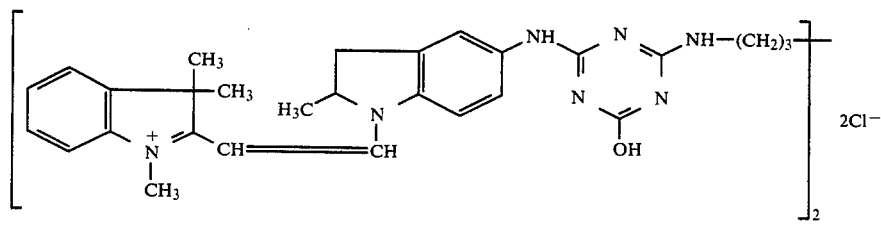

which dyes sulphite pulp with good fastness properties.

$\lambda_{max} = 445$ nm.

The starting material used here is prepared as follows:

6.76 g of the intermediate already described in Example 3, of the formula

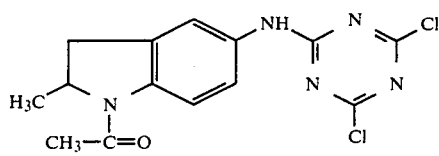

are taken with 50 ml of tetramethylurea and 1.05 g of sodium carbonate, and a solution of 1.16 g of hexamethylenediamine in 50 ml of tetramethylurea is added dropwise. During this addition, the temperature rises to 30° C. After addition of a spatula-tip of crown ether, the mixture is warmed at 40° C. for 3 hours. It is poured onto 600 ml of water and filtered off with suction.

Yield: 11.6 g of the compound of the formula

Yield: 5.3 g of the starting compound used above.

EXAMPLE 5

5.2 g of the compound of the formula

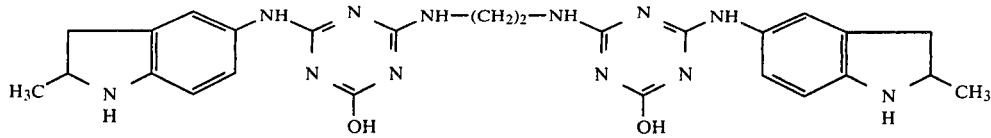

which is obtained analogously to the starting compound described in Example 4, using 0.56 g of ethylenediamine instead of 1.16 g of hexamethylenediamine, are heated at 40° C. in 50 ml of glacial acetic acid with 3.7 g of 1,3,3-trimethyl-2-methyleneindoline-ω-aldehyde for 24 hours. The mixture is poured onto 100 ml of water and the dyestuff is precipitated with NaCl solution, filtered off with suction and dried in vacuo.

Yield: 6.1 g of a yellow dyestuff of the formula

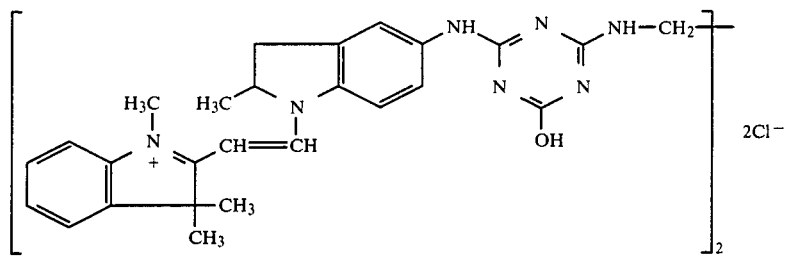

which dyes sulphite pulp with good fastness properties. $\lambda_{max}=447$ nm.

EXAMPLE 6

5.28 g of the compound of the formula

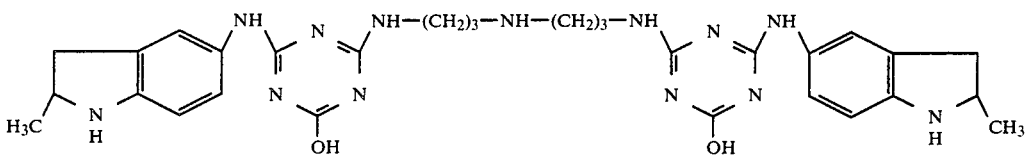

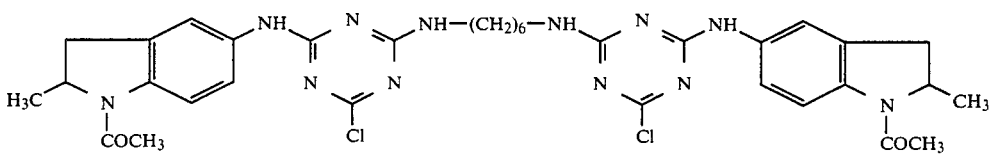

The product obtained above is heated under reflux in 150 ml of concentrated hydrochloric acid for 1 hour, the mixture is poured onto 1 liter of water and brought to pH 7 with NaOH and the product is filtered off with suction and dried at 50° C.

are warmed at 40° C. with 3.04 g of 1,3,3-trimethyl-2-methyleneindoline-ω-aldehyde and 60 ml of glacial acetic acid for 4 hours. The mixture is poured onto 200 ml of water and the dyestuff is precipitated with NaCl solution and filtered off with suction.

Yield: 6 g of a dyestuff of the formula

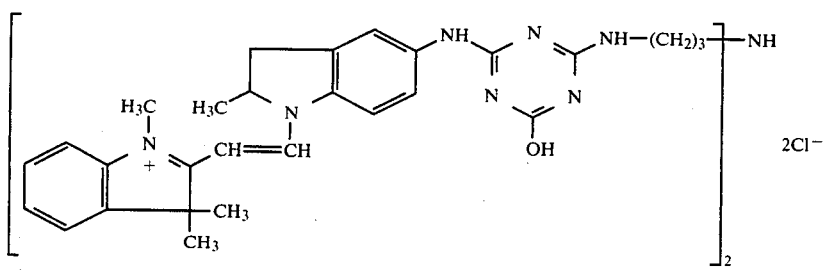

which dyes bleached and unbleached sulphite pulp with good fastness properties.

$\lambda_{max}$=447 nm.

The starting substance used here is obtained as follows:

6.76 g of the reaction product of 1 mol of cyanuric chloride and 1 mol of 1-acetyl-2-methyl-5-aminoindoline are taken with 50 ml of tetramethylurea and 2.1 g of Na$_2$CO$_3$, and a solution of 1.31 g of dipropylenetriamine in 50 ml of tetramethylurea is added dropwise. The mixture is heated at 40° C. for 4 hours and poured onto 600 ml of water and the product is filtered off with suction. After drying, 10 g of reaction product are obtained, and are heated under reflux in 70 ml of concentrated hydrochloric acid for 1 hour. The mixture is poured onto 500 ml of water, the pH is brought to 7–8 with NaOH and the product is filtered off with suction. After drying in vacuo at 50° C., 5.28 g of the starting substance used above are obtained.

EXAMPLE 7

3.5 g of the compound of the formula

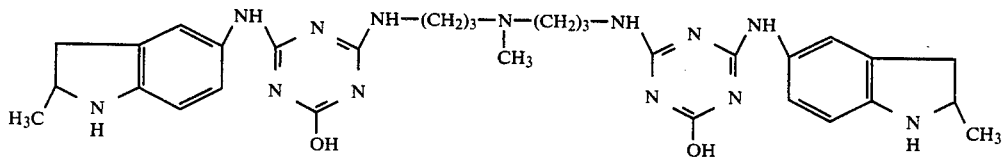

are stirred at 40° C. with 1.7 g of 1,3,3-trimethyl-2-methyleneindoline-ω-aldehyde in 50 ml of glacial acetic acid for 24 hours, the mixture is poured onto 300 ml of water and the dyestuff is salted out with NaCl, filtered off with suction and dried. 2.1 g of a dyestuff of the formula

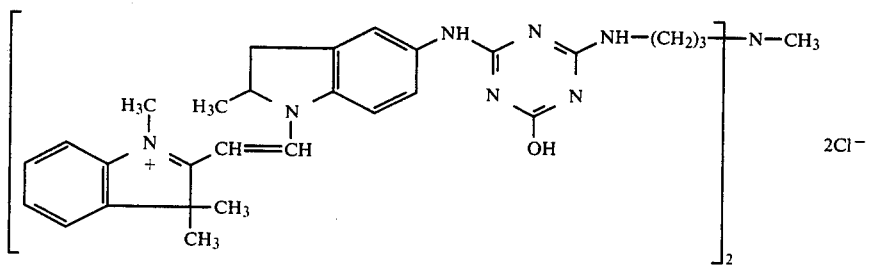

which dyes sulphite pulp with good fastness properties, are obtained.

$\lambda_{max}$=444 nm.

The starting substance used here is prepared as follows:

6.76 g of the reaction product of 1 mol of cyanuric chloride and 1 mol of 1-acetyl-2-methyl-5-aminoindoline are taken in 50 ml of tetramethylurea with 1.05 g of Na$_2$CO$_3$, and a solution of 1.45 g of methyl-bis-(3-aminopropyl)-amine in 50 ml of tetramethylurea is added dropwise at 20°–30° C. The mixture is warmed at 40° C. for 3 hours and poured onto 600 ml of water and the product is filtered off with suction. The moist precipitate is heated under reflux with 70 ml of concentrated hydrochloric acid for 1 hour. The mixture is poured onto 500 ml of water and brought to pH 7–8 with NaOH and the product is filtered off with suction and dried in vacuo at 50° C.

Yield: 3.5 g of the starting substance used above.

EXAMPLE 8

4.5 g of the compound of the formula

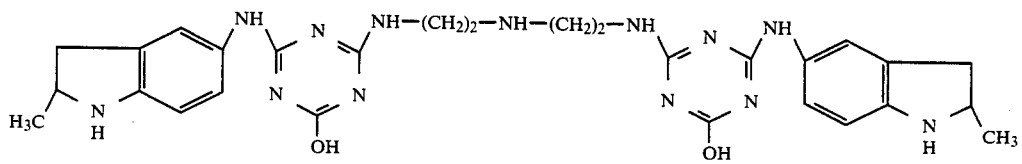

are heated at 40° C. with 2.72 g of 1,3,3-trimethyl-2-methyleneindoline-ω-aldehyde in 60 ml of glacial acetic acid for 4 hours. The mixture is poured onto 200 ml of water and the dyestuff is precipitated with NaCl solution and dried in vacuo.

4.89 g of a dyestuff of the formula

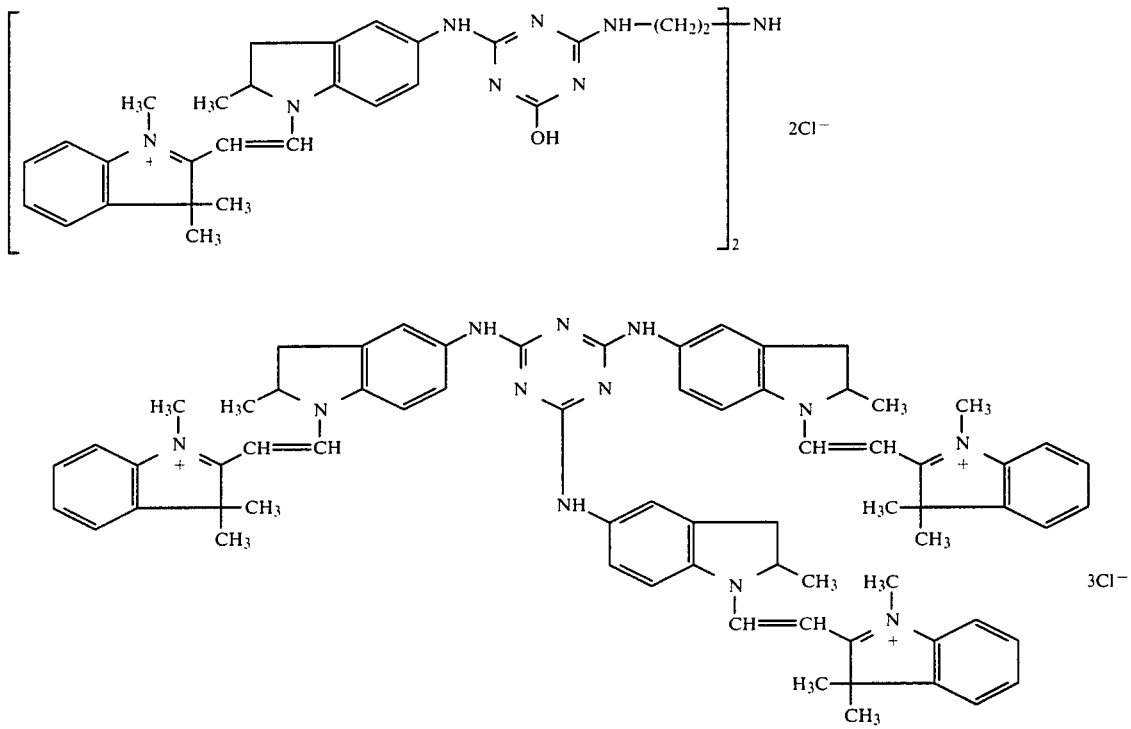

which dyes sulphite pulp with good fastness properties, are obtained.

$\lambda_{max} = 446$ nm.

The starting substance used here is prepared as follows:

6.76 g of the reaction product of 1 mol of cyanuric chloride and 1 mol of 1-acetyl-2-methyl-5-aminoindoline are taken in 50 ml of tetramethylurea with 1.05 g of $Na_2CO_3$, and a solution of 1.03 g of bis-(aminoethyl)-amine in 50 ml of tetramethylurea is added dropwise. The mixture is warmed at 40° C. for 3 hours and poured onto 60 ml of water and the product is filtered off with suction. The precipitate is heated to the boiling point under reflux in 70 ml of concentrated hydrochloric acid for 1 hour. The mixture is poured onto 500 ml of water and brought to pH 7–8 with NaOH and the product is filtered off with suction and dried in vacuo.

Yield: 4.5 g of the starting substance used above.

EXAMPLE 9

5.2 g of the compound of the formula

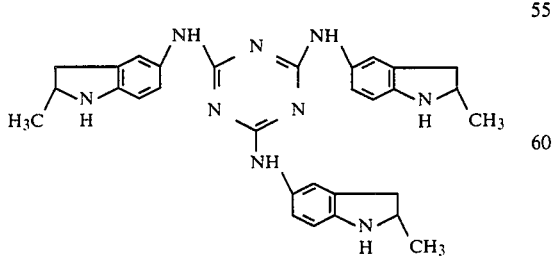

are heated at 40° C. in 70 ml of glacial acetic acid with 4.7 g of 1,3,3-trimethyl-2-methyleneindoline-ω-aldehyde for 16 hours. The mixture is poured onto 600 ml of water and the dyestuff is precipitated with NaCl solution, if necessary with the addition of an emulsifier. 7.7 g of a dyestuff of the formula which dyes sulphite pulp with good fastness properties, are obtained.

$\lambda_{max} = 452$ nm.

The starting substance used here is prepared as follows:

11.1 g of the 1-acetyl-2-methyl-5-aminoindoline described in Example 1 are taken with 5.04 g of sodium bicarbonate in 100 ml of chloroform, and 3.78 g of cyanuric chloride in 50 ml of chloroform are added dropwise. The mixture is heated at the boiling point under reflux overnight and the chloroform is then distilled off. The residue is recrystallised from chloroform.

Yield: 7.76 g of the compound of the formula

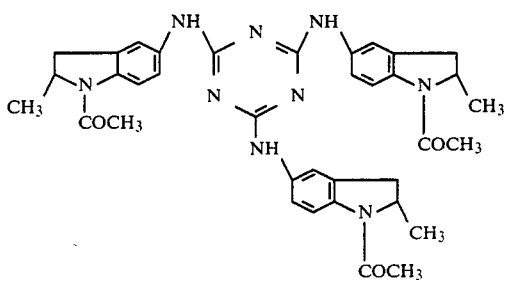

Melting point: 197° C.

7.5 g of the intermediate described above are heated at 90° C. with 100 ml of concentrated hydrochloric acid for 1 hour. The mixture is poured onto 300 ml of water and rendered alkaline with NaOH, and the starting substance used above is obtained after filtration with suction.

EXAMPLE 10

A bleached sulphite dry pulp is beaten and ground to a SR freeness of 40° in a Hollander with an amount of water such that the dry content is somewhat greater than 2.5%, and the thick pulp is then adjusted to a dry content of exactly 2.5% with water. 5 g of a 0.25% strength aqueous solution of the dyestuff according to Example 2 are added to 200 g of this thick pulp and the mixture is stirred for 5 minutes. The pulp is diluted to 700 ml with about 500 g of water and sheets of paper are produced therefrom in a known manner by suction over a sheet-forming machine. These sheets have an intense, yellow colouration. The amount of dyestuff which has not bonded to the paper is determined photometrically in the effluent of the sheet-forming machine, and amounts to about 6%.

What is claimed is:

1. A cationic enamine dyestuff compound of the formula

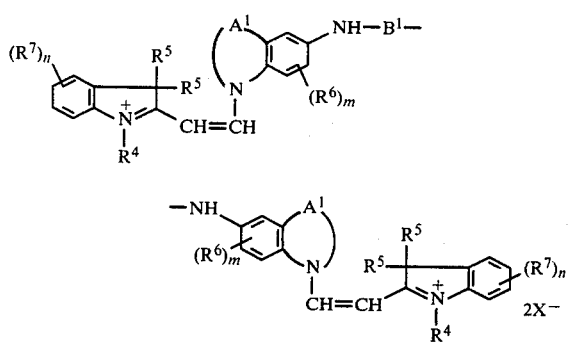

in which $R^4$ represents an alkyl radical which has 1 to 4 C atoms and is optionally substituted by hydroxyl, alkoxy with 1 to 4 C atoms, acetoxy, halogen, cyano, carboxyl, $C_1$-$C_4$-carbalkoxy, carboxamido or acetyl, $R^5$ represents an alkyl radical with 1 to 4 C atoms, or the two radicals $R^5$ are closed to form a cyclopentyl or cyclohexyl ring, $R^6$ represents an alkyl radical with 1 to 4 C atoms, an alkoxy radical with 1 to 4 C atoms or halogen, $R^7$ represents an alkyl radical with 1 to 4 C atoms, halogen, alkoxy with 1 to 4 C atoms, phenoxy, benzyloxy, benzyl, carboxyl, a carboxylic acid alkyl ester with 1 to 4 C atoms, a carboxamide or sulphonamide group which is optionally substituted by 1 or 2 $C_1$ to $C_4$-alkyl radicals, alkylsulphonyl with 1 to 4 C atoms, phenylsulphonyl, or a cyano, nitro, trifluoromethyl, acetyl or benzoyl group, $A^1$ represents a —$(CH_2)_2$— or —$(CH_2)_3$— group which is optionally further substituted by alkyl groups with 1 to 4 C atoms, $B^1$ corresponds to a radical of the formula

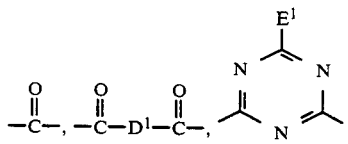

or

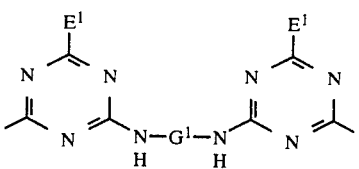

in which $D^1$ represents an alkylene radical with 2 to 6 C atoms or a phenylene or naphthylene radical, $E^1$ represents halogen, hydroxyl, alkoxy with 1 to 4 C atoms or a radical of the formula

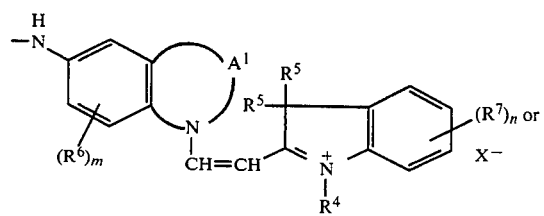

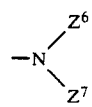

wherein $Z^6$ and $Z^7$ independently of one another designate hydrogen or the radical —$Y^1$—$Z^8$, wherein $Y^1$ represents alkylene with 1 to 6 C atoms and $Z^8$ designates hydrogen, hydroxyl, pyridinium or the radical

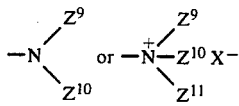

wherein $Z^9$, $Z^{10}$ and $Z^{11}$ independently of one another denote hydrogen or alkyl which has 1 to 4 C atoms and is optionally substituted by hydroxyl, and $Z^9$ also represents phenyl, benzyl or the radical

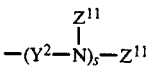

wherein $Y^2$ represents alkylene with 2 to 4 C atoms and s represents 1 to 8, or $Z^6$ and $Z^7$, and $Z^9$ and $Z^{10}$ are closed to form a pyrrolidine, morpholine, piperidine or piperazine ring, which can be substituted by $C_1$- to $C_4$-alkyl or amino-$C_1$- to $C_4$-alkyl, $G^1$ represents an alkylene radical with 2 to 6 C atoms, a phenylene radical or a radical of the formula

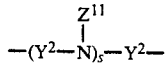

m and n independently of one another represent 0, 1 or 2 and $X^-$ represents an anion.

2. A cationic enamine dyestuff compound according to claim 1, of the formula

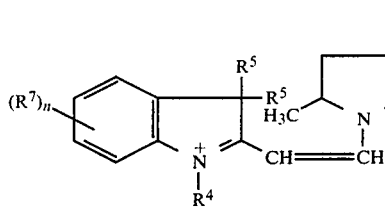

in which o represents 0 or 1, in particular 0, $B^2$ represents a radical of the formula

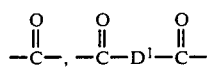

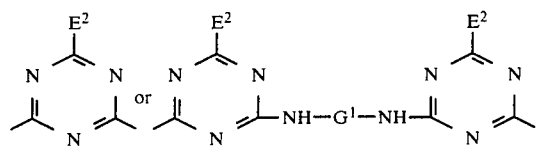

and $E^2$ represents halogen, hydroxyl, alkoxy with 1 to 4 C atoms or a radical of the formula

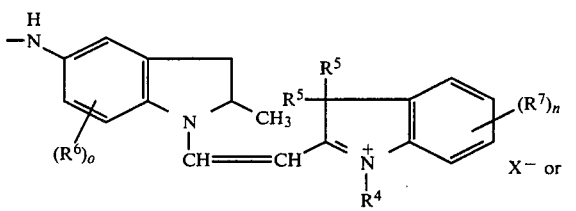

$R^4$, $R^5$, $R^6$, $R^7$, $D^1$, $G^1$, $Z^6$, $Z^7$, n and $X^-$ have the same meaning as in claim 1.

3. A cationic enamine dyestuff compound according to claim 1, of the formula

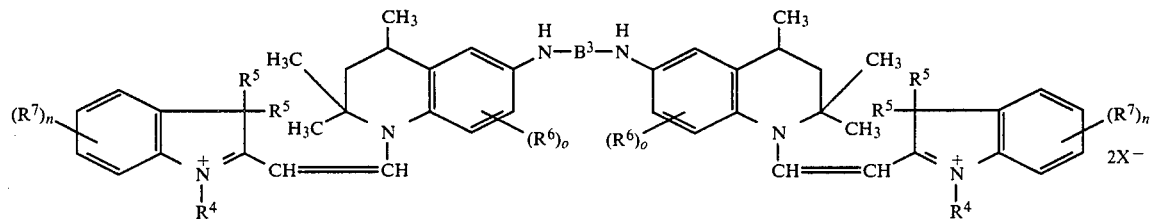

wherein o represents 0 or 1, preferably 0, $B^3$ represents a radical of the formula

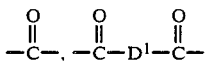

-continued

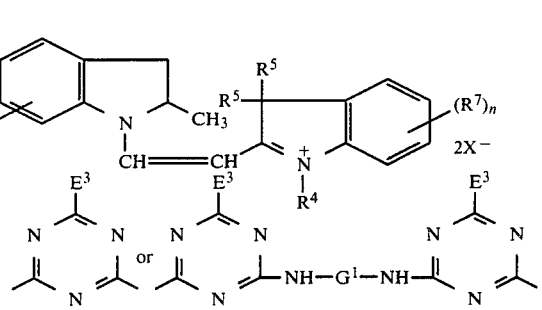

and $E^3$ represents halogen, hydroxyl, alkoxy with 1 to 4 C atoms or a radical of the formula

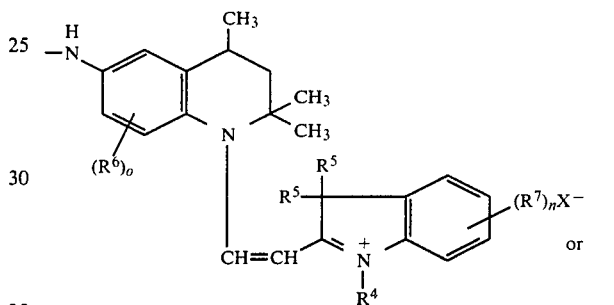

and wherein $R^4$, $R^5$, $R^6$, $R^7$, $D^1$, $G^1$, $Z^6$, $Z^7$, n and $X^-$ have the same meaning as in claim 1.

4. A cationic enamine dyestuff compound according to claim 2, wherein $R^4$ represents methyl, ethyl or $C_2$- to $C_4$-hydroxyalkyl, $R^5$ represents methyl or ethyl, $R^7$ represents $C_1$- to $C_4$-alkyl, halogen or $C_1$- to $C_4$-alkoxy, $B^2$ represents —CO—,

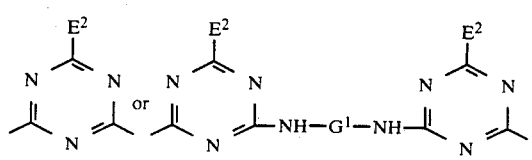

E² represents halogen, hydroxyl, alkoxy with 1 to 4 C atoms or

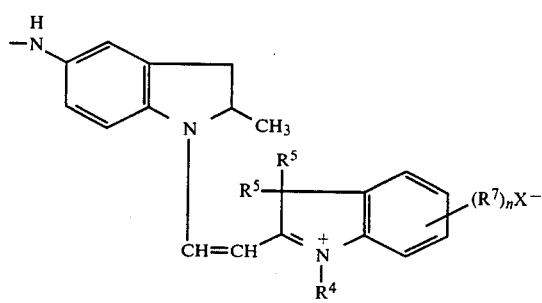

B³ represents —CO—,

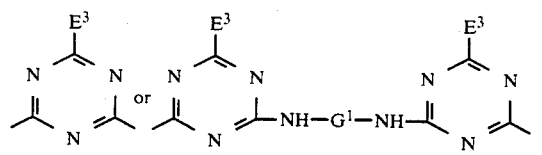

E³ represents halogen, hydroxyl, alkoxy with 1 to 4 C atoms or

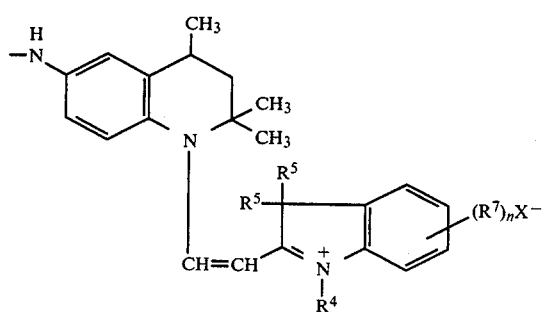

o represents 0 and
n represents 0 or 1.

5. A cationic enamine dyestuff compound according to claim 3,
wherein
R⁴ represents methyl, ethyl or $C_2$- to $C_4$-hydroxyalkyl,
R⁵ represents methyl or ethyl,
R⁷ represents $C_1$- to $C_4$-alkyl, halogen or $C_1$- to $C_4$-alkoxy,
B² represents —CO—,

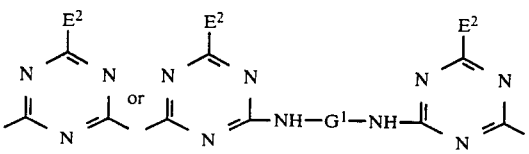

E² represents halogen, hydroxyl, alkoxy with 1 to 4 C atoms or

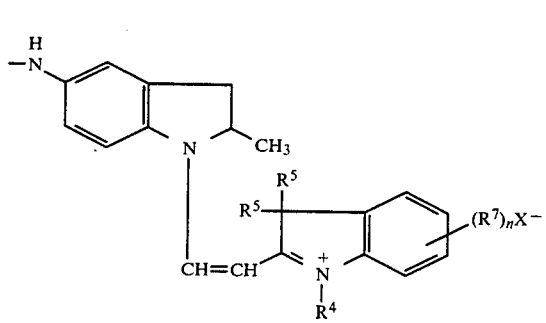

B³ represents —CO—,

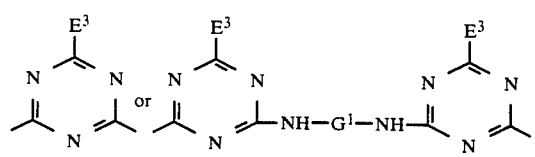

E³ represents halogen, hydroxyl, alkoxy with 1 to 4 C atoms or

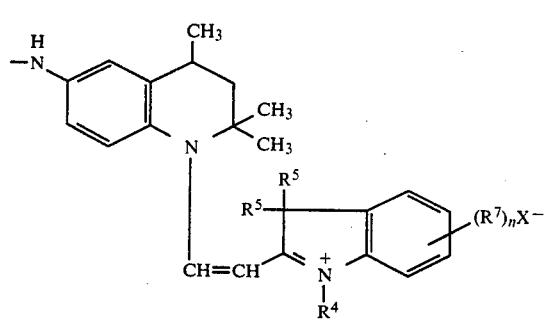

o represents 0 and
n represents 0 or 1.

* * * * *